Nov. 14, 1944.  A. F. MEYER  2,362,658
TAPERED TANK CONSTRUCTION
Original Filed June 26, 1942   3 Sheets-Sheet 1

INVENTOR.
Arnold F. Meyer,
BY Morsell & Morsell
ATTORNEYS.

Nov. 14, 1944. A. F. MEYER 2,362,658
TAPERED TANK CONSTRUCTION
Original Filed June 26, 1942  3 Sheets-Sheet 2
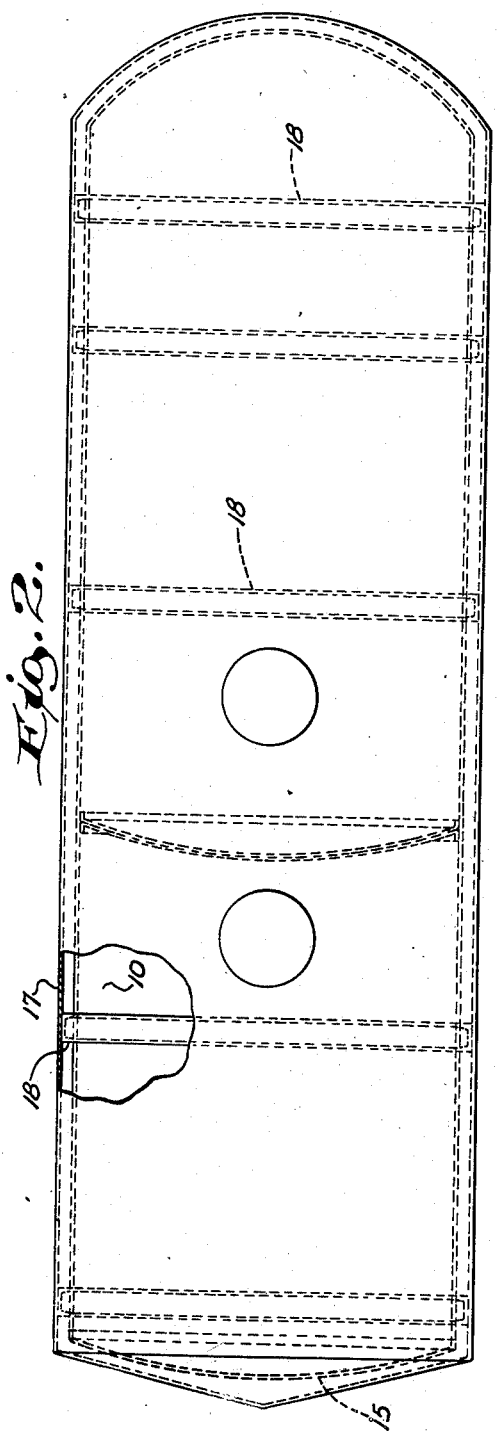
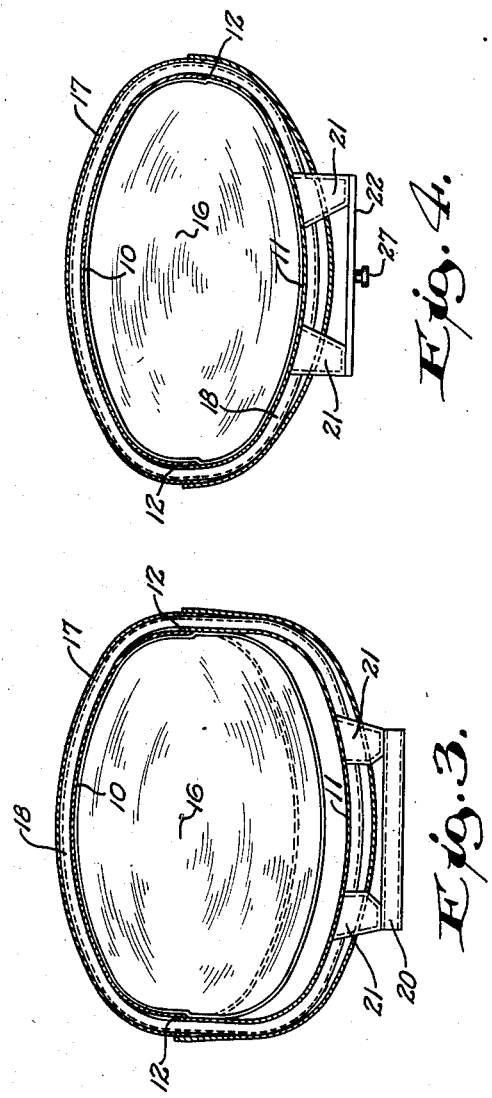
INVENTOR.
Arnold F. Meyer,
BY Morsell + Morsell
ATTORNEYS.

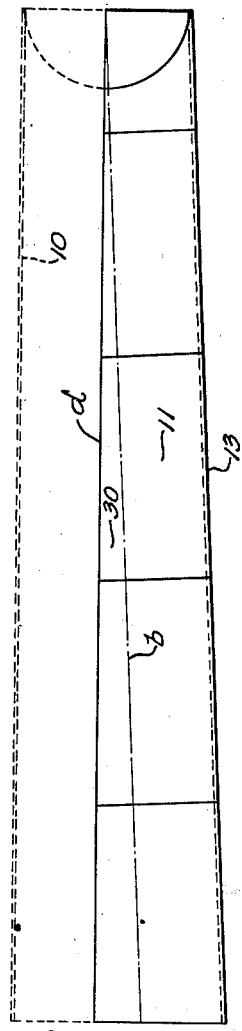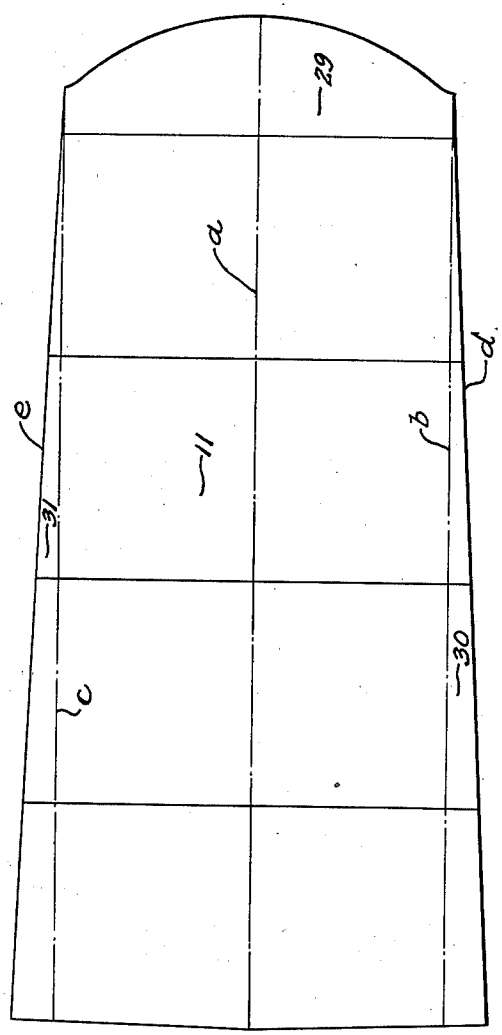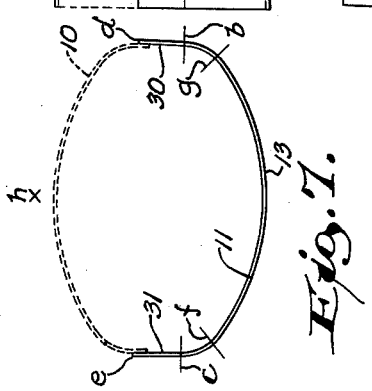

Patented Nov. 14, 1944

2,362,658

UNITED STATES PATENT OFFICE 2,362,658

TAPERED TANK CONSTRUCTION

Arnold F. Meyer, Pewaukee, Wis., assignor to The Heil Co., Milwaukee, Wis., a corporation of Wisconsin Original application June 26, 1942, Serial No. 448,657. Divided and this application April 14, 1943, Serial No. 483,036

2 Claims. (Cl. 220—5)

This invention relates to improvements in tapered tank construction, and is a division of application Serial No. 448,657, filed June 26, 1942, and a continuation in part of application Serial No. 448,656, filed June 26, 1942.

In my application, Serial No. 448,656, I have described a tapered transportable tank for incorporation in a wheeled vehicle, such as a semi-trailer. The tank, disclosed in said co-pending application, and also forming the subject of this application, has decided advantages over the conventional trailer tank of uniform cross-sectional area or a trailer tank of the so-called "drop-frame" type. It is characterized by a tapered formation, increasing in cross-sectional area from one end to the other, with the tank being of substantially ovate form in cross-section, and fabricated from a pair of complementary longitudinally extending plates, each of substantially semi-oval form with adjacent overlapping edges of the complementary plates being secured together along longitudinal lines on opposite sides of the tank. There are, however, certain problems involved in the economical and expeditious fabrication of a tank of the class above described, and a primary object of the present invention is the provision of a tapered tank construction which is practical, and economical and expeditious to manufacture on large scale operations.

In the transportable tank under consideration the longitudinal median of the top of the tank is substantially horizontal, or at the same elevation from the ground throughout, while the longitudinal median of the bottom of the tank is gradually and uniformly downwardly inclined from front to rear. The curved top section of the tank may be formed from a composite sheet of rectangular formation which is uniformly rolled to the correct curvature. However, to provide for the tapering shape of the tank the curved lower section thereof, which is preferably a composite sheet of gradually increasing width toward one end, presents complications to avoid complicated rolling operations wherein the axis of the roller would ordinarily have to be changed continuously with respect to its angle with the center line of the sheet.

It is, therefore, a more specific object of the invention to provide a tapered bottom section forming sheet for a tank susceptible of being rolled in a manner to eliminate the difficulty above mentioned and wherein said sheet may be uniformly rolled to curved formation by a roller whose axis continuously parallels the center line of the sheet, the roller operations being terminated along parallel lines adjacent the opposite side edges of the sheet to leave straight and unrolled transition sections of tapered formation, the latter when joined to the side edges of the curved top section of the tank compensating for the gradual change in cross-sectional area from the front to the rear of the tank.

A further object of the invention is to provide a tapered tank construction having complementary curved top and bottom tank sections, the former being of uniform cross-sectional area throughout, and the latter being of gradually increasing cross-sectional area from front to rear.

A further object of the invention is to provide a curved bottom forming tank section whose major intermediate portion is rectangular and is curved in a uniform arc, and whose side edge portions are of triangular formation and plane.

With the above and other objects in view, the invention consists of the improved tapered tank construction and its parts and combinations as set forth in the claims, and all equivalents thereof.

In the accompanying drawings in which the same reference characters indicate the same parts in all of the views:

Fig. 2 is a top view of the tank with a portion of the outer casing broken away and in section;

Fig. 3 is a transverse vertical sectional view taken on line 3—3 of Fig. 1;

Fig. 4 is a transverse vertical sectional view taken on line 4—4 of Fig. 1;

Fig. 5 is a plan view of a composite blank used for forming the bottom section of the tank;

Fig. 6 is a side view illustrating the blank of Fig. 5 after it has been rolled into curved, semi-ovate form, the relationship of an upper tank section to said bottom section being shown in dotted lines; and Fig. 7 is a rear end view of the curved bottom section of Fig. 6 with a dotted line showing of the curved top section associated therewith.

Figure 1:
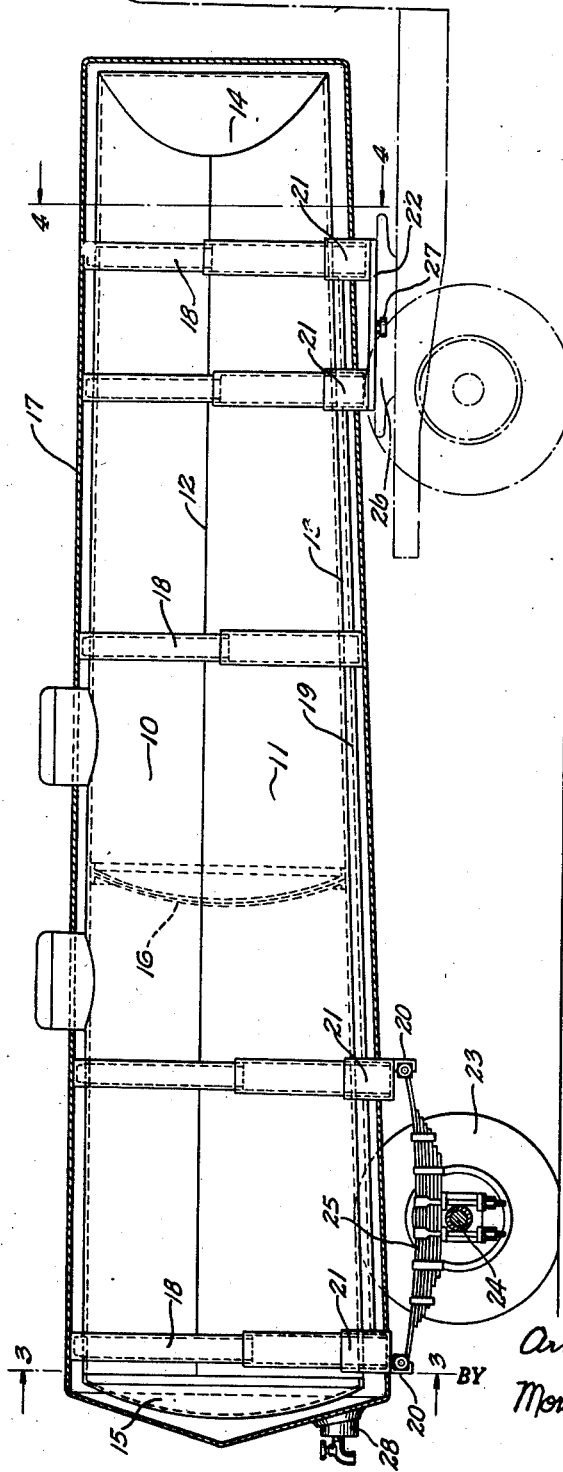
Fig. 1 is a side view of an improved curved and tapered trailer tank, constructed according to the present invention, with the outer casing of the tank and the axle shown in section.

A completed curved and tapered tank embodied in a vehicle of the semi-trailer type is shown in Figs. 1 to 4 inclusive. Generally speaking there is an inner metallic shell formed of complementary upper and lower sections 10 and 11 respectively, each curved into substantially semi-ovate form and having its edges in overlapping relationship and welded to provide longitudinal side seams 12. The shell is of gradually increasing cross-sectional area from front to rear and is arranged to provide a gradually and uniformly rearwardly sloping bottom 13. The top of the shell is, however, horizontal and of uniform height from the ground throughout. Both ends of the shell are closed by suitable welded in heads 14 and 15. The interior of the shell may be subdivided by a suitable positioned partition 16.

The inner shell is enclosed by an outer sheet-metal casing 17 which is shaped similarly to the shape of the inner shell and which is fabricated in a manner similar to the fabrication of the inner shell. The outer casing is spaced from the inner shell by means of channeled bands 18.

Supporting and reinforcing members include longitudinal ribs 19, transverse beams 20, and relatively low supporting feet 21. At the rear of the tank the feet 21 are supported on the transverse beams 20 and extend through openings in the outer casing 17, straddle portions of the bands 18, and engage and support the inner shell 10. At the forward end of the tank the supporting feet 21 extend upwardly from a fifth wheel plate 22 and similarly project through openings in the outer casing 17 and engage and support the inner shell 10.

The vehicular mounting for the rear and enlarged end of the tank assemblage comprises a set of rear supporting wheels 23 rotatably mounted upon a transverse rear trailer axle 24 which is associated with leaf springs 25, the latter being pivotally attached to the transverse beams 20.

The forward end of the semi-trailer vehicular structure is adapted to be supported by the rear end of a tractor or other propelling vehicle. As shown in Fig. 1, the tank carried fifth wheel plate 22 cooperates with the tractor carried complementary fifth wheel 26, with the result that the front end portion of the tank vehicle is turnable through the engagements of the cooperating fifth wheel members 22 and 26 and a king pin 27.

It will thus be seen that in the vehicular tank the rear end portion of the tank is resiliently supported on trailer wheels at a relatively low elevation, close to the spring and axle assembly. The forward end portion of the tank, which is of reduced cross-sectional area, is supported on the tractor at a proper elevation somewhat higher than the elevation of the rear of the tank. The vehicular tank, over all, is relatively low and has a low center of gravity. It is also to be observed that the bottom of the commodity carrying tank is uniformly downwardly inclined from front to rear so that gravity will cause the contents to flow rearwardly for discharge through a rear dispensing valve 28.

As previously mentioned, the curved and tapered tank shell is fabricated from a pair of metal sheets 10 and 11 respectively. The sheet 10 to form the curved top section of the tank shell is rectangular, while the sheet 11 (see Fig. 5) to form the curved bottom section of the tank shell of increasing cross-sectional area, is substantially quadrilateral, increasing in width from front to rear and having at its front end a curved section 29 which accommodates the front head 14 of the completed tank. Both of the sheets 10 and 11, because of the relatively great length of the same, are preferably of composite form, being made up of smaller sections welded together.

With the present invention the shaping of the top forming sheet 10 presents no unusual problems. A roller is used to curve the sheet in a desired, uniform arc, it being noted that extreme side edges of the sheet are left plane for convenience in lapping the same with the side edges of the bottom forming sheet 11.

Referring now more specifically to Fig. 5, which depicts the bottom forming blank, it will be noted that the longitudinal center line thereof is indicated by the character $a$. Equidistant from the center line $a$ are indicated lines $b$ and $c$ which are both parallel to the center line. At the reduced end of the sheet 11 the lines $b$ and $c$ merge with the extremities of the rectilineal outer side edges of said sheet, designated $d$ and $e$, respectively. Hence the portion of the sheet 11 between the lines $b$, $d$ and the wide end of the sheet is of triangular formation, as is the narrow area bounded by the lines $c$, $e$ and the wide end of the sheet. The major portion of the sheet between the lines $b$ and $c$ is substantially rectangular. The latter portion of the sheet may be readily curved into a desired arc by a roller operating on the sheet substantially between the lines $b$ and $c$. It is highly important to observe that the axis of the roller may be maintained parallel to the center line $a$ of the sheet, so the rolling operation, carried out in this manner is very simple and expeditious. As a practical matter the major rolling operations stop a trifle short of the lines $b$ and $c$, and that portion of the sheet between points $f$ and $g$ in Fig. 7 is curved in a uniform arc whose center is at point $h$. Between points $f$ and $c$, and $g$ and $b$ the radius of curvature is increased so that the plane surfaced triangular areas 30 and 31 project upwardly perpendicularly.

The enclosed tank body or shell is composed of the curved top and bottom forming plates 10 and 11 respectively, the former being of uniform breadth throughout, and the latter gradually increasing in breadth from front to rear. Portions of the plane side edges 30 and 31 of the sheet 11 are arranged so as to overlap the depending plane side edges of the top sheet 10. The sheets are connected in this relationship by the side longitudinal lines of weld 12 previously mentioned. The ends of the shell are then closed by the welded in end heads 14 and 15 also previously mentioned.

In the exemplification illustrated the inner shell is surrounded by an outer sheet metal casing 17. This casing is similar in shape to the inner shell and is formed of complementary curved top and bottom plates rolled into form in a manner similar to that employed in connection with the sheets of the shell and similarly connected together.

While it is preferable to form the sheets of the shell and casing by sections welded together with the rolling operations being performed on the large composite sheets, it is possible to first roll each section of a sheet, and subsequently connect the small sections to form the large composite, curved sheets.

It might ordinarily be supposed that in forming a tapered tank of a pair of curved complementary plates, each plate would have to be of increasing breadth from one end to the other. This would necessitate complicated rolling operations for both plates wherein the axis of the roller would have to be changed continuously. In the present invention no such complications are presented. A simple top plate, of uniform breadth throughout, susceptible of easy rolling, is provided. With this easily formed top plate is a tapered bottom plate, but due to the provision of the triangular transition areas at the sides thereof, which are plane, the rolling of the major portion of the plate or sheet is simplified.

As will be noted from Figs. 1 and 6, the lines of connection between the top and bottom sheets at opposite sides of the shell are parallel to the longitudinal median of the top of the shell, instead of biased or inclined downwardly. The longitudinal median of the bottom of the shell is inclined downwardly toward the rear of the shell. This relationship is preserved when the tank is mounted on wheels, as in Fig. 1, and is of considerable advantage. The top of the tank remains horizontal and at a uniform elevation from the ground. The bottom portion of the rear of the tank may be supported at a relatively low elevation, while the bottom portion of the front of the tank is somewhat higher for proper engagement with a tractor fifth-wheel mechanism.

Various changes and modifications may be made in the tank construction without departing from the spirit of the invention, and all such changes are contemplated as may come within the scope of the claims.

What is claimed as the invention is:

1. A tank shell, including a pair of complementary body-forming sheets, one of the same being of uniform breadth and having its major portion curved, and the other sheet being of gradually increasing breadth from one end portion to the other and having its major portion curved in a uniform arc throughout its length, the latter sheet having side edge areas of triangular formation and plane, said side edge areas being secured to adjacent side edge portions of the first-mentioned sheet along longitudinal lines on opposite sides of the tank, said tank being ovate in cross-section with its major cross-sectional dimension extending across the width of the tank.

2. A tank shell, including an elongated top sheet of uniform breadth and having its major portion uniformly curved, and an elongated bottom sheet of gradually increasing breadth from one end portion to the other and having a major rectangular area thereof curved in a uniform arc throughout its length, said bottom sheet having its side portions of triangular formation and plane and secured to adjacent side edge portions of the top sheet along both sides of the tank, the side edges of the bottom sheet being parallel to the longitudinal median of the top of the shell and at an acute angle to the longitudinal median of the bottom of the shell, said shell being of gradually increasing cross-sectional area from one end to the other and of substantially ovate form in cross-section with its major cross-sectional dimension extending across the width of the tank.

ARNOLD F. MEYER.